(12) United States Patent
Campbell

(10) Patent No.: US 10,998,790 B2
(45) Date of Patent: May 4, 2021

(54) FIBER WOVEN INSULATOR FOR ELECTRIC GENERATOR

(71) Applicant: Hamilton Sundstrand Corporation, Charlotte, NC (US)

(72) Inventor: Kris H. Campbell, Poplar Grove, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 112 days.

(21) Appl. No.: 16/363,104

(22) Filed: Mar. 25, 2019

(65) Prior Publication Data
US 2020/0313489 A1    Oct. 1, 2020

(51) Int. Cl.
*H02K 3/34* (2006.01)
*H02K 3/32* (2006.01)
*H02K 3/30* (2006.01)
*H02K 1/32* (2006.01)

(52) U.S. Cl.
CPC ............... *H02K 3/32* (2013.01); *H02K 1/325* (2013.01); *H02K 3/30* (2013.01); *H02K 3/345* (2013.01)

(58) Field of Classification Search
CPC .. H02K 3/32; H02K 3/30; H02K 3/34; H02K 3/345; H02K 1/04; H02K 1/26; H02K 1/32; H02K 1/325
USPC .................................... 310/184, 215, 52–65
See application file for complete search history.

(56) References Cited

U.S. PATENT DOCUMENTS

| | | | |
|---|---|---|---|
| 2,320,866 A | 6/1943 | Hill | |
| 3,749,950 A | 7/1973 | Lenz | |
| 3,891,880 A | 6/1975 | Britsch | |
| 4,447,947 A * | 5/1984 | McCarty | H02K 3/24 174/15.6 |
| 4,582,749 A * | 4/1986 | Boulter | B32B 27/08 442/292 |
| 6,426,578 B1 | 7/2002 | Mori et al. | |
| 2002/0070621 A1* | 6/2002 | Mori | H02K 3/30 310/215 |
| 2005/0218741 A1 | 10/2005 | Wnorowski et al. | |
| 2011/0273043 A1 | 11/2011 | Raad | |
| 2014/0183989 A1* | 7/2014 | Lenschow | H02K 3/325 310/54 |
| 2015/0042198 A1* | 2/2015 | Brockschmidt | H02K 3/345 310/215 |
| 2015/0140885 A1 | 5/2015 | Eder et al. | |

OTHER PUBLICATIONS

European Search Report for application No. 19210458 filed on Nov. 20, 2019; dated Jul. 2, 2020; 8 pages.

* cited by examiner

Primary Examiner — Michael Andrews
(74) Attorney, Agent, or Firm — Cantor Colburn LLP

(57) ABSTRACT

An electric generator including: a main generator, including a rotating portion having main field windings; a stationary portion having generator armature windings; and a woven insulator at least partially enclosing the main field windings of the rotating portion, the woven insulator being included of strips or fibers of a material woven together, wherein the woven insulator is permeable to a coolant in a liquid form.

14 Claims, 3 Drawing Sheets

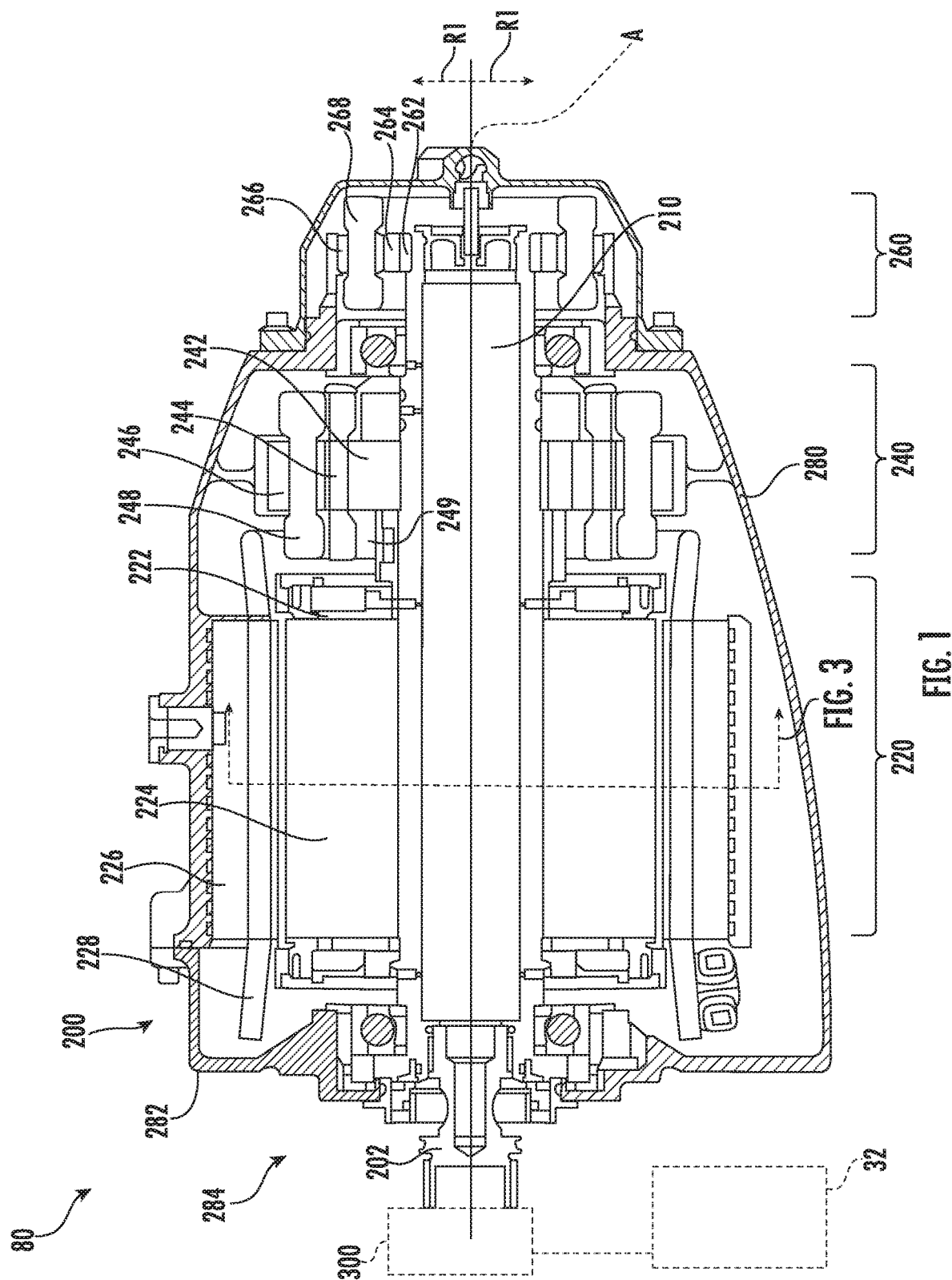

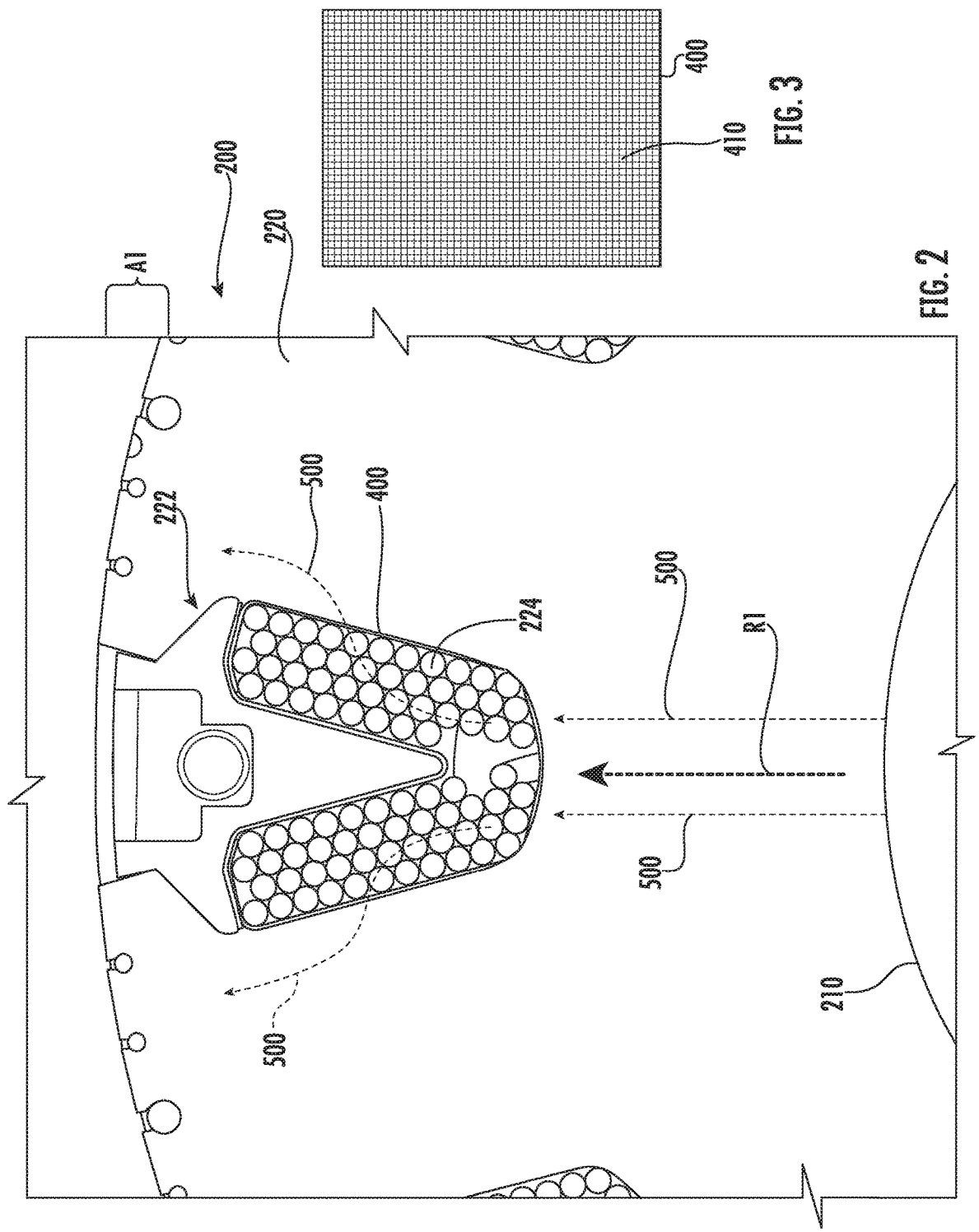

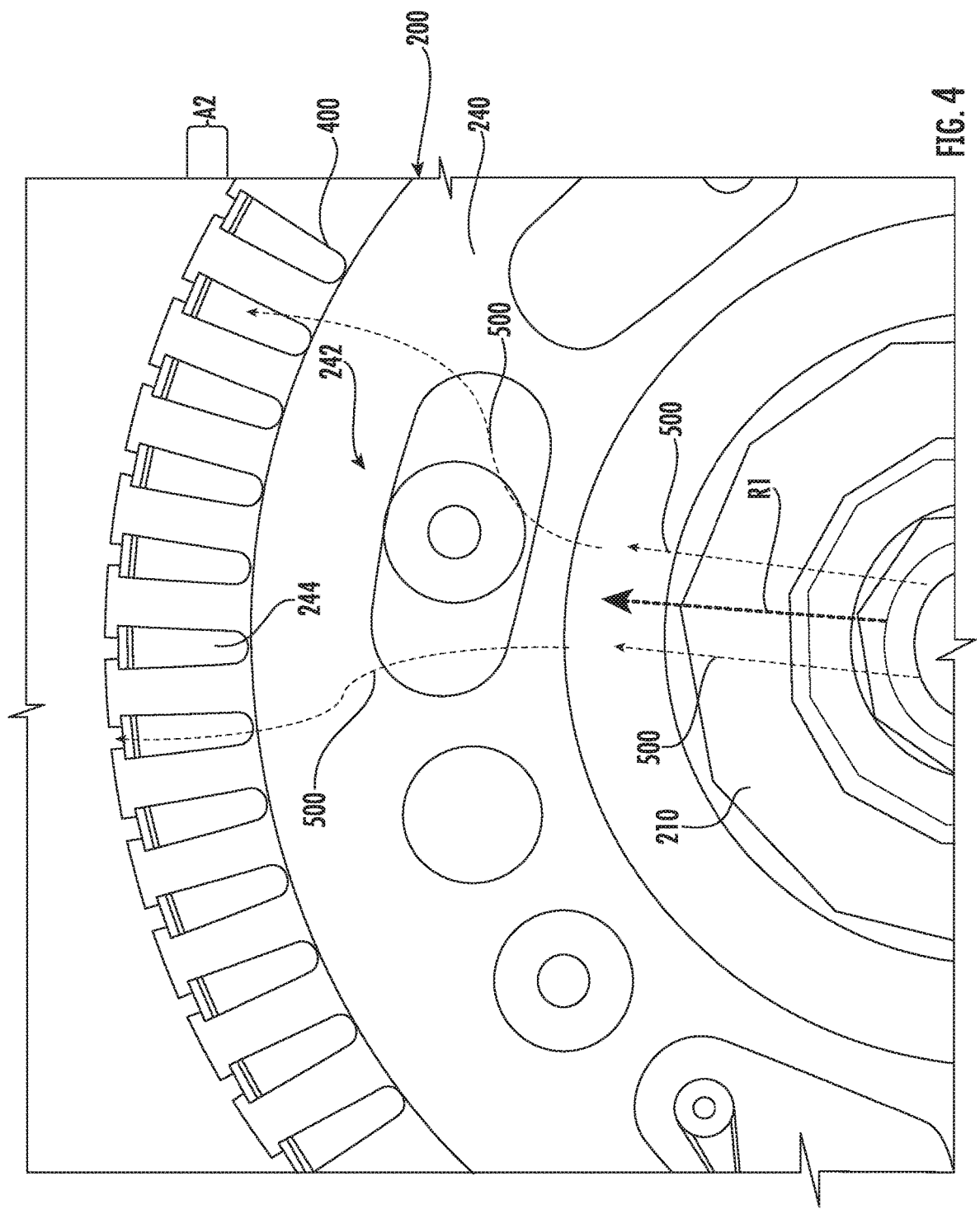

FIBER WOVEN INSULATOR FOR ELECTRIC GENERATOR

BACKGROUND

The subject matter disclosed herein generally relates to electrical generators, and more specifically to a method and an apparatus for cooling electrical generators.

Electric generators are becoming more energy dense, and this is leading to thermal challenges. One of these challenges is to get a coolant to the hottest portions of the electric generator.

BRIEF SUMMARY

According to one embodiment, an electric generator is provided. The electric generator including: a main generator, including a rotating portion having main field windings; a stationary portion having generator armature windings; and a woven insulator at least partially enclosing the main field windings of the rotating portion, the woven insulator being included of strips or fibers of a material woven together, wherein the woven insulator is permeable to a coolant in a liquid form.

In addition to one or more of the features described above, or as an alternative, further embodiments may include that the woven insulator fully encloses the main field windings of the rotating portion.

In addition to one or more of the features described above, or as an alternative, further embodiments may include that the stationary portion is radially outward from the rotating portion.

In addition to one or more of the features described above, or as an alternative, further embodiments may include: coolant located within the electric generator, wherein the coolant migrates from the rotating portion to the stationary portion during operation of the electric generator.

In addition to one or more of the features described above, or as an alternative, further embodiments may include that the coolant is in a gaseous form when migrating from the rotating portion to the stationary portion during operation of the electric generator.

In addition to one or more of the features described above, or as an alternative, further embodiments may include that the woven insulator is configured to electrically insulate the main field windings of the rotating portion from other components of the electric generator.

In addition to one or more of the features described above, or as an alternative, further embodiments may include that the material is at least one of polyamide, imide, aramid, and glass.

According to another embodiment, an electric generator is provided. The electric generator including: an exciter generator, including a rotating portion having exciter armature windings; a stationary portion having exciter windings; and a woven insulator at least partially enclosing the exciter armature windings of the rotating portion, the woven insulator being included of strips or fibers of a material woven together, wherein the woven insulator is permeable to a coolant in a liquid form.

In addition to one or more of the features described above, or as an alternative, further embodiments may include that the woven insulator fully encloses the exciter armature windings of the rotating portion.

In addition to one or more of the features described above, or as an alternative, further embodiments may include that the stationary portion is radially outward from the rotating portion.

In addition to one or more of the features described above, or as an alternative, further embodiments may include: coolant located within the electric generator, wherein the coolant migrates from the rotating portion to the stationary portion during operation of the electric generator.

In addition to one or more of the features described above, or as an alternative, further embodiments may include that the coolant is in a gaseous form when migrating from the rotating portion to the stationary portion during operation of the electric generator.

In addition to one or more of the features described above, or as an alternative, further embodiments may include that the woven insulator is configured to electrically insulate the exciter armature windings of the rotating portion from other components of the electric generator.

In addition to one or more of the features described above, or as an alternative, further embodiments may include that the material is at least one of polyamide, imide, aramid, and glass.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 1 is a cross-sectional illustration of an electric generator, according to an embodiment of the present disclosure;

FIG. 2 is an axial cross-sectional illustration of the electric generator of FIG. 1, according to an embodiment of the present disclosure;

FIG. 3 is a schematic illustration of a woven insulator for use in the electric generator of FIGS. 1 and 2, according to an embodiment of the present disclosure; and FIG. 4 is an axial cross-sectional illustration of the electric generator of FIG. 1, according to an embodiment of the present disclosure.

DETAILED DESCRIPTION

A detailed description of one or more embodiments of the disclosed apparatus and method are presented herein by way of exemplification and not limitation with reference to the Figures.

Electric generators are becoming more energy dense, and this is leading to thermal challenges. One of these challenges is to get a coolant to the hottest portions of the electric generator, when electrical components need to be electrically insulated. Traditional electric insulators used in electric generators are nonporous, and thus do not allow coolant to pass through. Embodiments disclosed herein seek to provide a porous insulator for cooling the electric generator.

Referring now to FIG. 1, a cross-section view of an electric generator 200, in accordance with an embodiment of the present disclosure. The electric generator 200 may be operably connected to a mechanical power source 32 through a gearbox 300. The gear box 300 may or may not be required. A drive shaft coupling 202 may operably connect the electric generator 200 to gearbox 300. The mechanical power source 32 is configured to rotate a shaft 210 of the electric generator 200 (e.g., through the gear box 300) and the electric generator 200 is configured to generate electricity in response to the rotation of the shaft 210.

The electric generator 200 may be a three-stage electrical generator that includes a main generator 220, an exciter generator 240, and a permanent magnet generator 260. While the electric generator 200 illustrated in FIG. 2 is a three-stage electrical generator, the embodiments disclosed herein may be incorporated into any other electrical generator. The main generator 220, the exciter generator 240, and the permanent magnet generator 260 may each be brushless. The main generator 220 includes a main field winding 224 on a rotating portion 222 and a generator armature winding 228 of a stationary portion 226. The exciter generator 240 includes a rotating exciter armature winding 244 on a rotating portion 242 and an exciter winding 248 on a stationary portion 246. The permanent magnet generator 260 includes permanent magnets 264 employed on a rotating portion 262 and a winding 268 on a stationary portion 266. The rotating portion 222 of the main generator 220, the rotating portion 242 of the exciter generator 240, and the rotating portion 262 of the permanent magnet generator 260 may each be operably connected to the shaft 210 of the electric generator 200 and configured to rotate with the shaft 210.

The rotation of permanent magnets 264 generates an alternating current voltage on windings 268 of the stationary portion 266. The AC voltage provided by the permanent magnet generator 260 is selectively applied on an exciter winding 248 to a stationary portion 246 of the exciter generator 240. The exciter winding 248 generates a field that interacts with rotating exciter armature windings 244 on a rotating portion 242 of the exciter generator 240 to provide an AC voltage. A rotating rectifier assembly 249 rectifies the AC voltage and supplies the DC voltage to a main field winding 224 on the rotating portion 222 of the main generator 220. The rotating portion 222 may be operably connected to the mechanical power source 32 through the shaft 210 and configured to rotate when the mechanical power source 32 rotates. Rotation of the shaft 210 and the main field winding 224 induces three-phase AC output voltage on the generator armature winding 228 of the stationary portion 226 of the main generator 220.

The electric generator 200 is incased in a structural support housing 280 that provides structure support for the electric generator 200. The structural support housing 280 may at least partially enclose the electric generator 200. The structural support housing 280 may fully enclose the electric generator 200 with the exception of the drive shaft coupling 202 extending through the structural support housing 280 to connect to the gearbox 300.

Referring now to FIGS. 2 and 3 with continued reference to FIG. 1, a cross-sectional view of the main generator 220 is illustrated in FIG. 2 and a woven insulator 400 is illustrated in FIG. 3, in accordance with an embodiment of the present disclosure. A coolant 500 may be used to cool the main generator 220. In an embodiment, the coolant 500 is a two-phase fluid capable of existing in a gaseous form and/or a liquid form. The coolant 500 may be an oil or any other coolant known to one of skill in the art. It is understood that while the main generator 220 is illustrated in FIG. 2, the coolant 500 may be utilized similarly to cool other parts of the electric generator 200. The coolant 500 may be introduced into the main generator 220 from the shaft 210 to the rotating portion 222 of the main generator 220 and then may migrate in a radially outward direction R1 towards the stationary portion 226 of the electric generator 200. Due to elevated operating temperatures of the rotating portion 222 the coolant 500 may undergo a phase change and change from liquid form to gaseous form. The coolant 500 may have transformed into a gaseous form by the time the coolant 500 exits the rotating portion 222. Advantageously, friction is reduced between the stationary portion 226 and the rotating portion 222 by the coolant 500 being in a gaseous form rather than a liquid form in an area A1 between the stationary portion 226 and the rotating portion 222.

A woven insulator 400 at least partially encloses the generator field winding 224 of the rotating portion 222. In an embodiment, the woven insulator 400 may fully enclose the generator field winding 224 of the rotating portion 222. The woven insulator 400 is configured to electrically insulate the generator field windings 224 from other components of the electric generator 200 while being permeably to coolant 500 in a gaseous or liquid form. The woven insulator 400 may be composed of a single electrically resistive material that is broken up into fibers or strips 410 and then woven together, as shown in FIG. 3. In one embodiment, the material of the woven insulator 400 may be polyamide/imide, aramid, glass, or similar material known to one of skill in the art.

The woven composition of the woven insulator 400 allows the woven insulator 400 to be porous, which allows coolant 500 in a gaseous or liquid form to flow through the woven insulator 400. Once the coolant enters the rotating portion 222 by passing through the woven insulator 400, the coolant 500 may be in thermal communication with the generator field windings 224 of the rotating portion 222 and absorb heat from the generator field windings 224 of the rotating portion 222 prior to exiting the rotating portion 222 through the woven insulator 400.

The woven insulator 400 may also be utilized in the exciter generator 240 as shown in FIG. 4 or anywhere within the electric generator 200 where extra cooling and electrical insulation is needed.

Referring now to FIG. 4 with continued reference to FIGS. 1-3, a cross-sectional view of the exciter generator 240 is illustrated in FIG. 4, in accordance with an embodiment of the present disclosure. A coolant 500 may be used to cool the exciter generator 240. In an embodiment, the coolant 500 is a two-phase fluid capable of existing in a gaseous form and/or a liquid form. The coolant 500 may be an oil or any other coolant known to one of skill in the art. It is understood that while the exciter generator 240 is illustrated in FIG. 4, the coolant 500 may be utilized similarly to cool other parts of the electric generator 200. The coolant 500 may be introduced into the exciter generator 240 from the shaft 210 to the rotating portion 242 of the exciter generator 240 and then may migrate in a radially outward direction R1 towards the stationary portion 246 of the electric generator 200. Due to elevated operating temperatures of the rotating portion 242 the coolant 500 may undergo a phase change and change from liquid form to gaseous form. The coolant 500 may have transformed into a gaseous form by the time the coolant 500 exits the rotating portion 242. Advantageously, friction is reduced between the stationary portion 246 and the rotating portion 242 by the coolant 500 being in a gaseous form rather than a liquid form in an area A2 between the stationary portion 246 and the rotating portion 242.

A woven insulator 400 at least partially encloses the exciter field winding 244 of the rotating portion 242. In an embodiment, the woven insulator 400 may fully enclose the exciter armature windings 244 of the rotating portion 242. The woven insulator 400 is configured to electrically insulate the exciter armature windings 244 from other components of the electric generator 200 while being permeably to coolant 500 in a gaseous or liquid form. The woven insulator 400 may be composed of a single electrically resistive material that is broken up into fibers or strips 410 and then woven together, as shown in FIG. 3. In one embodiment, the material of the woven insulator 400 may be polyamide/imide, aramid, glass, or similar material known to one of skill in the art.

The woven composition of the woven insulator 400 allows the woven insulator 400 to be porous, which allows coolant 500 in a gaseous or liquid form to flow through the woven insulator 400. Once the coolant enters the rotating portion 242 by passing through the woven insulator 400, the coolant 500 may be in thermal communication with the exciter armature windings 244 of the rotating portion 242 and absorb heat from the exciter armature windings 244 of the rotating portion 242 prior to exiting the rotating portion 242 through the woven insulator 400.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric generator, comprising:
   a main generator, comprising
   a rotating portion having main field windings;
   a stationary portion having generator armature windings;
   a woven insulator at least partially enclosing the main field windings of the rotating portion, the woven insulator being comprised of strips or fibers of a material woven together, wherein the woven insulator is permeable to a coolant in a liquid form; and
   coolant located within the electric generator,
   wherein the woven insulator allows the coolant in a gaseous or liquid form to flow through the woven insulator, and
   wherein the coolant migrates from the rotating portion to the stationary portion by passing through the woven insulator during operation of the electric generator.

2. The electric generator of claim 1, wherein the woven insulator fully encloses the main field windings of the rotating portion.

3. The electric generator of claim 1, wherein the stationary portion is radially outward from the rotating portion.

4. The electric generator of claim 1, wherein the coolant is in a gaseous form when migrating from the rotating portion to the stationary portion during operation of the electric generator.

5. The electric generator of claim 1, wherein the woven insulator is configured to electrically insulate the main field windings of the rotating portion from other components of the electric generator.

6. The electric generator of claim 1, wherein the material is at least one of polyamide, imide, aramid, and glass.

7. The electric generator of claim 1, wherein once the coolant enters the rotating portion by passing through the woven insulator the coolant is in thermal communication with the generator field windings of the rotating portion, and wherein the coolant absorbs heat from the generator field windings of the rotating portion.

8. An electric generator, comprising:
   an exciter generator, comprising
   a rotating portion having exciter armature windings;
   a stationary portion having exciter windings;
   a woven insulator at least partially enclosing the exciter armature windings of the rotating portion, the woven insulator being comprised of strips or fibers of a material woven together, wherein the woven insulator is permeable to a coolant in a liquid form; and
   coolant located within the electric generator,
   wherein the woven insulator allows the coolant in a gaseous or liquid form to flow through the woven insulator, and
   wherein the coolant migrates from the rotating portion to the stationary portion by passing through the woven insulator during operation of the electric generator.

9. The electric generator of claim 8, wherein the woven insulator fully encloses the exciter armature windings of the rotating portion.

10. The electric generator of claim 8, wherein the stationary portion is radially outward from the rotating portion.

11. The electric generator of claim 8, wherein the coolant is in a gaseous form when migrating from the rotating portion to the stationary portion during operation of the electric generator.

12. The electric generator of claim 8, wherein the woven insulator is configured to electrically insulate the exciter armature windings of the rotating portion from other components of the electric generator.

13. The electric generator of claim 8, wherein the material is at least one of polyamide, imide, aramid, and glass.

14. The electric generator of claim 8, wherein once the coolant enters the rotating portion by passing through the woven insulator the coolant is in thermal communication with the exciter armature windings of the rotating portion, and wherein the coolant absorbs heat from the exciter armature windings of the rotating portion.

* * * * *